G. L. DUDLEY.
CHANGE SPEED TRANSMISSION HUB FOR MOTORCYCLES.
APPLICATION FILED DEC. 31, 1915.
1,323,031.
Patented Nov. 25, 1919.
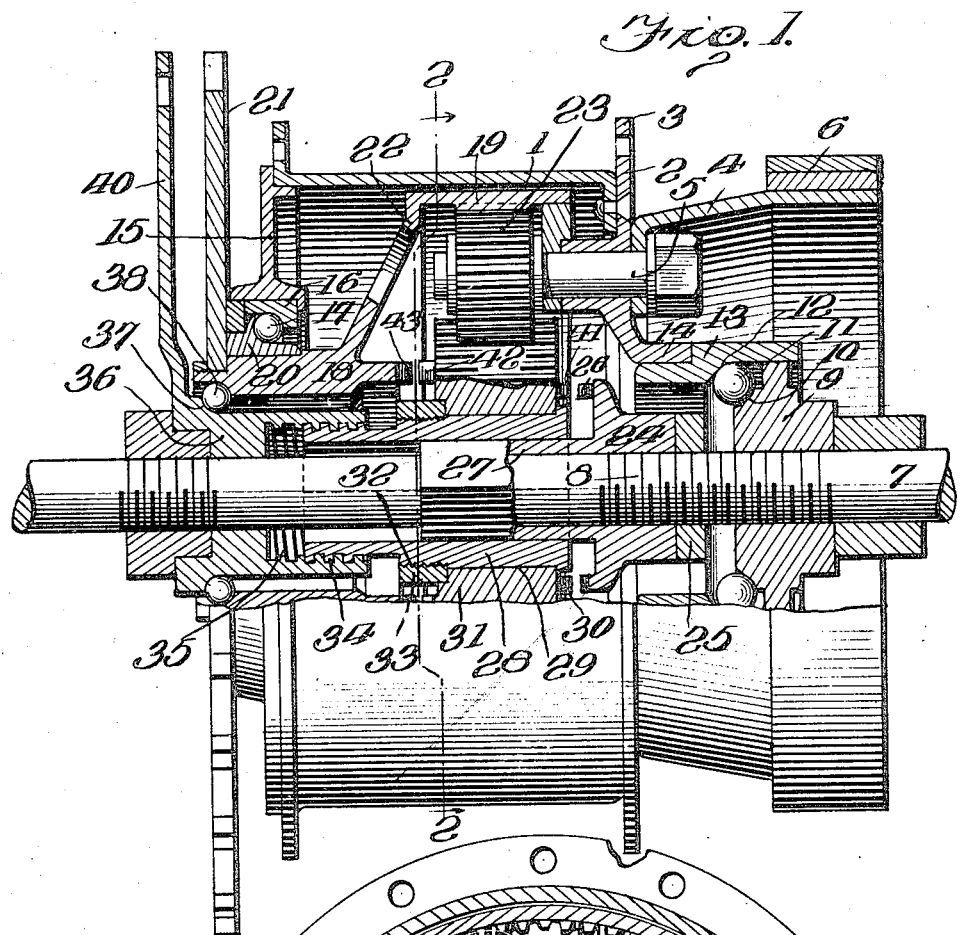
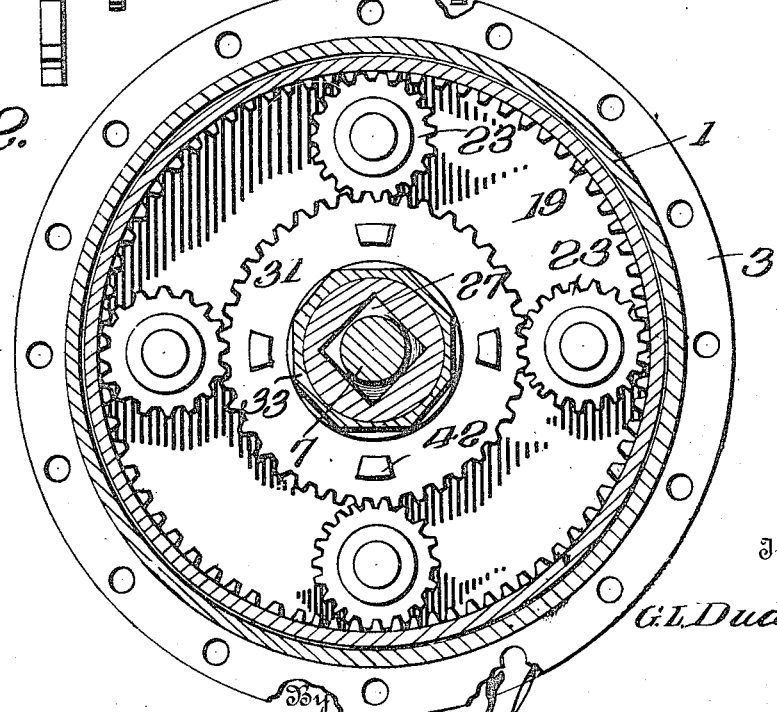
Inventor
G. L. Dudley.
By
W. H. Stacy,
Attorneys

UNITED STATES PATENT OFFICE.

GEORGE L. DUDLEY, OF CHESTER, PENNSYLVANIA.

CHANGE-SPEED TRANSMISSION-HUB FOR MOTORCYCLES.

1,323,031. Specification of Letters Patent. Patented Nov. 25, 1919.

Application filed December 31, 1915. Serial No. 69,616.

*To all whom it may concern:*

Be it known that I, GEORGE L. DUDLEY, a citizen of the United States, residing at Chester, in the county of Delaware and State of Pennsylvania, have invented certain new and useful Improvements in Change-Speed Transmission-Hubs for Motorcycles, of which the following is a specification.

This invention relates to motorcycle transmission change speed hubs and aims to provide a hub of this type substantial in construction and compact in the arrangement of its parts and capable of ready and convenient manipulation to obtain high or low speed or a neutral position of the parts when it is desired that the engine shall run free.

Briefly stated, the invention contemplates the provision in a hub of this type of a system of planetary gearing, one element of which is carried by a sleeve which is shiftable through the medium of a control sleeve having threaded engagement therewith and adapted to be oscillated in any desired manner for the purpose of shifting the first mentioned sleeve whereby to obviate the use of complicated lever arrangements and other actuating devices liable to become disarranged or broken under severe strain.

Another aim of the invention is to so construct the hub that the spindle therefor will be free from obstructions from end to end and to so mount the parts carried thereby that the hub may be readily taken apart whenever desired and its parts readily reassembled without likelihood of disarranging such parts as it is not desired to disturb or remove.

In the accompanying drawings:

Figure 1 is a view partly in elevation and partly in vertical longitudinal section through the hub embodying the present invention.

Fig. 2 is a vertical transverse sectional view on the line 2—2 of Fig. 1 looking in the direction indicated by the arrows.

In the drawings the numeral 1 indicates in general the cylindrical barrel or body of the hub provided at one end with a head 2 either integral therewith or secured thereto in any suitable manner and provided with a spoke flange 3. The numeral 4 indicates a brake drum which is secured to the head 2 by means of bolts 5 which serve an additional purpose to be presently fully explained, and this brake drum is provided with the usual brake band indicated at 6. The spindle for the head is indicated in general by the numeral 7 and near one end is threaded as indicated at 8 and fitted on to the said end of the spindle is a bearing cone 9 having a ball race 10 receiving bearing balls 11, these balls being received also in a race 12 formed in a thimble 13 fitted within an annular flange or collar 14 carried by the head 2. The other end of the hub barrel is indicated at 15 and is provided with a ball race 16 in which are received bearing balls 17. The numeral 18 indicates in general the hub of a gear 19 which constitutes one element of the planetary gear system above referred to and this hub carries a ball race 20 also receiving the bearing balls 17. A sprocket drive gear 21 is also fixed upon the hub 18 and is designed to be driven from the engine shaft in the customary manner. The manner in which the hub 18 is mounted for rotation will be presently more fully explained.

The gear 19 above referred to is the main driving gear of the planetary system and is laterally displaced with respect to the inner end of the hub 18 and supported by an integral web 22, the gear being, of course, housed within the drum 1. In any suitable manner pinions 23 are mounted upon the inner ends of the bolts 5 and mesh with the teeth of the gear 19 as clearly shown in Fig. 2 of the drawings. Threaded on to the portion 8 of the spindle 7 is a collar 24 held at adjustment by means of a jam nut 25 also threaded on to the said portion of the head and the inwardly presented face of this collar is provided with a number of clutch teeth 26 which serve a purpose to be presently explained. The said inwardly presented face of the collar 24 is also provided with an integral sleeve extension 27 interiorly cylindrical to snugly fit the spindle 7 and exteriorly of polygonal form. The gear carrying sleeve heretofore mentioned is indicated in general by the numeral 28 and is interiorly polygonal so as to slidably and nonrotatably fit the sleeve extension 27 in the manner clearly shown in the two figures of the drawings. This sleeve at one end is exteriorly cylindrical as at 29 and is provided at its said end with an annular flange 30 and a gear 31 is rotatably fitted upon the said portion of the sleeve 28 and rests at one end against the said flange. The sleeve 28 is provided with a threaded portion 32 upon which is fitted a ring nut 33 which bears lightly against the other side of the gear, the gear being in this manner held against displacement upon the sleeve and yet being freely rotatable thereon. Beyond this threaded portion 32, the sleeve 28 is provided exteriorly with relatively large threads 34 which engage with threads formed interiorly of the control sleeve above mentioned, which sleeve is indicated by the numeral 36. The control sleeve rotatably fits the spindle 7 as shown in Fig. 1 and is provided with a ball race 37 which opposes a ball race 38 in the hub 18 and within which races are received bearing balls 39, the hub 18 being in this manner rotatably mounted independent of the said control sleeve and the control sleeve in a like manner being mounted for rotation independent of the said gear hub 18. In order that the control sleeve 36 may be oscillated it is provided with a lever arm 40 which may be connected to any suitable means for moving the same and it will be understood that when the said arm 40 is rocked forwardly the rotary motion of the control sleeve will impart lateral shifting movement to the gear carrying sleeve 28 in one direction and when the said arm is rocked rearwardly the said gear carrying sleeve will be shifted in the opposite direction. The gear 31 is provided upon its face which is presented toward the collar 24 with a series of clutch teeth 41 designed to coöperate with the teeth 26 when the sleeve 28 is shifted in the direction of the said collar and the gear is provided upon its other face with a series of clutch teeth 42 designed to coöperate with similar teeth 43 formed upon a flange 44 carried by the inner end of the gear hub 18, when the said sleeve 28 is shifted in the other direction or, in other words, toward the said gear hub 18.

It will now be understood that when the sleeve 28 is in the position shown in Fig. 1 of the drawings, the teeth 41 and 42 upon the gear 31 will be respectively out of engagement with the teeth 26 and 43 and consequently the gear 31 will be in neutral position and the engine may run free. When it is desired to travel at low speed the arm 40 is rocked forwardly, thereby shifting the sleeve 28 and the gear 31 carried thereby toward the right in Fig. 1, so as to bring the teeth 41 into engagement with the teeth 26. The gear 31 will then be held stationary inasmuch as the collar 24 which carries the teeth 26 is fixed with relation to the spindle 7 and this gear being held stationary, the pinions 23 will travel around the gear 31 carrying with them the hub 1. When it is desired to travel at high speed and to obtain a direct drive of the hub from the sprocket 21, the arm 40 is swung rearwardly, thereby shifting the sleeve 28 toward the left in Fig. 1, so as to bring the teeth 42 into clutch with the teeth 43 and with the parts in this position the gears comprising the planetary gear system will be mutually locked as will be readily understood.

It will be understood that while it has been found convenient to employ clutch teeth upon the opposite faces of the gear 31 to coöperate with the teeth 26 and 43 upon the collar 24 and gear hub 18 respectively, any other suitable means may be provided for connecting the gear with the said collar and the said gear hub, the object in view being to connect the gear with the fixed spindle 7 for low speed and with the gear hub 18 for high speed.

Having thus described the invention, what is claimed as new is:

1. In a gear shifting mechanism for change speed hubs, a nonrotatable laterally shiftable sleeve, a gear element mounted for rotation thereon, and means for shifting the said sleeve.

2. In gear shifting mechanism for change speed hubs, a nonrotatable laterally shiftable sleeve, a gear element mounted for rotation thereon, and an oscillatory control sleeve coacting with the first mentioned sleeve and arranged when oscillated to shift the said first mentioned sleeve.

3. In a change speed hub, a system of change speed gearing, a nonrotatable laterally shiftable sleeve supporting an element of the said system, the said element being rotatable upon the sleeve, and means for shifting the said sleeve to cause the element to coact selectively with elements of the hub whereby to render the system operable to drive the hub at a selected one of the speeds.

4. In a change speed hub, a system of change speed gearing, a nonrotatable laterally shiftable sleeve supporting an element of the said system, the said element being rotatable upon the sleeve, and means for shifting the said sleeve to cause the element to coact selectively with elements of the hub thereby to render the system operable to drive the hub at a selected one of the speeds, the said means being also operable to shift the said gear element to position to render the system neutral.

5. In a change speed hub, a rotatable member, a system of planetary gearing including a main driving gear, a fixed spindle, a clutch member upon the spindle, a clutch member upon the rotatable member, and a shiftable sleeve, one element of the gear system being mounted upon the sleeve and having clutch elements arranged, when the sleeve is shifted in one direction or the other, to have selective coöperation with the first mentioned clutch members.

6. In a change speed hub, a rotatable hub member, a system of change speed gearing including a main driving gear, a fixed member, a shiftable member supporting one element of the change speed gearing, and means for shifting the said member whereby to lock the said gear element with the main driving gear or with the fixed member and also to neutral position.

7. In a change speed hub, a rotatable hub member, a system of planetary gearing including a main driving gear, a fixed spindle, a clutch member upon the spindle, a clutch member upon the main driving gear, and a sleeve shiftable upon the spindle, one element of the planetary gear system being rotatably mounted upon the said sleeve between the said clutch members and being provided with clutch elements for selective coöperation with the first mentioned clutch members.

8. In a change speed hub, a rotatable hub member, a system of planetary gearing including a main driving gear, a fixed spindle, a clutch member fixed with relation to the spindle, a clutch member carried by the said main driving gear, a sleeve mounted for shifting movement longitudinally upon the spindle, one element of the planetary gear system being rotatably mounted upon the said sleeve and having clutch elements for coöperation with the first mentioned clutch members selectively when the sleeve is shifted, and means rotatably mounted upon the spindle and coöperating with the said sleeve for shifting the same.

9. In a change speed hub, a rotatable hub member, a system of planetary gearing including a main driving gear, a fixed spindle, a clutch member fixed with relation to the spindle, a clutch member carried by the driving gear, a sleeve mounted for shifting movement longitudinally of the spindle, one element of the planetary gear system being rotatably mounted upon the said sleeve and having clutch elements for coöperation with the first mentioned clutch members selectively when the sleeve is shifted, the said sleeve being interiorly threaded, and a sleeve mounted for oscillatory movement upon the spindle and having threads engaging the threads of the first mentioned sleeve whereby the first mentioned sleeve may be shifted through the oscillation of the last mentioned sleeve.

10. In a change speed hub, a rotatable hub member, a system of change speed gearing including a main driving gear, a fixed member, a shiftable member supporting one element of the change speed gearing, and means for shifting the said member whereby to lock the said gear element with the main driving gear or with the fixed member or to shift the same to position out of coöperative relation with respect to the said main driving gear and the said fixed member.

11. In change speed gearing, a non-rotatable laterally shiftable sleeve, a rotatable sleeve operatively connected to the shiftable sleeve for laterally moving the same upon rotation of the rotatable sleeve, and gears connected to the shiftable sleeve adapted to be interlocked and released by the lateral movement of the shiftable sleeve.

12. In a change speed hub, a hub proper, a system of change speed gearing, operable to drive the hub at variable speeds, a non-oscillating sleeve supporting an independent rotative element of the said system, and means for moving the said sleeve to shift the said element and thereby render the system operable to drive the hub at a selected one of the speeds.

13. In a change speed hub, a hub proper, a system of change speed gearing operable to drive the hub at varying speeds, and capable of being rendered neutral, a non-rotative sleeve freely rotatably supporting an element of the said system, and means for moving the sleeve to shift the said element to render the system operable to drive the hub proper at a selected one of the speeds and also to render the system neutral.

14. In a change speed gear system, a laterally shiftable non-rotative gear setting element, a solid axle, and an oscillatory control means mounted on the axle and adapted to actuate the element.

15. In a gear shifting mechanism of the class described, a gear-setting sleeve mounting a gear element at one end, means operable to hold the said sleeve against relative movement, and a second gear setting sleeve coacting with the first-mentioned sleeve, and means for holding the said second-mentioned sleeve against lateral movement.

16. In a device of the class described, a hub, a system of change speed gearing operable to drive the said hub at variable speeds, a solid axle, a concentric non-shiftable control element mounted thereabout, a shiftable control element on the axle engaged with the first-mentioned control element to be shifted upon rocking of the first-mentioned control element, and means operable to rock the said element whereby a selected gear ratio may be obtained within the said hub.

17. In a change speed gear system, a laterally shiftable gear setting sleeve, an element of the said system being mounted for rotation on the sleeve, means operable to hold the said sleeve against rotative movement, and means for shifting the sleeve.

18. In a change speed gear system, a non-shiftable sleeve, means for rocking the said sleeve, a member of the said system being shiftable, and diagonal-mechanical-movement means on one end of the said sleeve whereby the said member is shifted when the said sleeve is rocked by the said means.

19. In a change speed gear system, a laterally shiftable non-rotative gear setting sleeve, an element of said system being mounted for rotation thereon, and oscillatory means operable to laterally shift the said sleeve.

20. In a change speed gear system, a hub, a non-shiftable rotatable sleeve, and a non-rotative shiftable sleeve adapted to be shifted upon rotation of the first-mentioned sleeve, an element of the gear system being carried by the last-mentioned sleeve.

21. In a change speed system of the class described, the combination of a hub proper, a laterally shiftable sleeve carrying an element of the said system, means operable to hold the said sleeve against oscillatory movement, and concentric oscillatory non-shiftable means operable to shift the said sleeve to effect a change of speed in the said system.

22. In combination, a change speed hub, a laterally shiftable non-rotative gear setting sleeve coöperating with an oscillatory means for shifting the said sleeve.

23. In change speed gearing of the class described, a hub, and coacting gear shifting sleeves, one of said sleeves being arranged to be oscillated by means outside of the hub proper.

24. In change speed gearing of the class described, a sleeve carrying an element of the said gearing, means holding the said sleeve against rotation, and concentric control means arranged to shift the said sleeve laterally.

25. In a change speed system of the class described, the combination of a non-rotative gear-setting sleeve mounting a gear element, and a non-shiftable sleeve, whereby the first-mentioned sleeve receives an impetus laterally when the second-mentioned sleeve is oscillated by a control means.

In testimony whereof I affix my signature.

GEORGE L. DUDLEY. [L. S.]